United States Patent [19]

Livne

[11] Patent Number: 4,679,615

[45] Date of Patent: Jul. 14, 1987

[54] METHOD AND APPARATUS FOR HEATING AND/OR COOLING OBJECTS SIMULTANEOUSLY AT DIFFERENT PRESELECTED TEMPERATURES

[75] Inventor: Avinoam Livne, Beersheva, Israel

[73] Assignee: Advanced Products Ltd., Beersheva, Israel

[21] Appl. No.: 707,152

[22] Filed: Mar. 1, 1985

[30] Foreign Application Priority Data

Mar. 2, 1985 [IL] Israel ............................................ 71131

[51] Int. Cl.⁴ .............................................. F28F 13/00
[52] U.S. Cl. ........................................... 165/1; 236/2; 237/3; 165/146; 165/58
[58] Field of Search ...................... 165/146, 61, 62, 58, 165/63, 1; 236/91 R, 91 D, 2, 3; 237/3

[56] References Cited

U.S. PATENT DOCUMENTS 104,491  0/1870  Poche ................................. 165/146
2,466,769  4/1949  Herold et al. ...................... 165/146
4,304,293  12/1981  Scheiwe et al. .................. 165/61 X

*Primary Examiner*—Henry A. Bennett
*Attorney, Agent, or Firm*—Benjamin J. Barish

[57] ABSTRACT

Apparatus and method are described for heating and/or cooling a plurality of objects simultaneously at different preselected temperatures, wherein a predetermined temperature difference is established between two spaced points on a heat-conductive member to produce a constant temperature gradient between the points; and then a plurality of objects are supported in heat exchange relationship with respect to predetermined locations of the temperature gradient according to the preselected temperatures to which the respective objects are to be heated or cooled. The apparatus further includes temperature control means for maintaining the two spaced points of the heat conductive member at the predetermined temperature difference during the heating or cooling of the objects.

10 Claims, 3 Drawing Figures

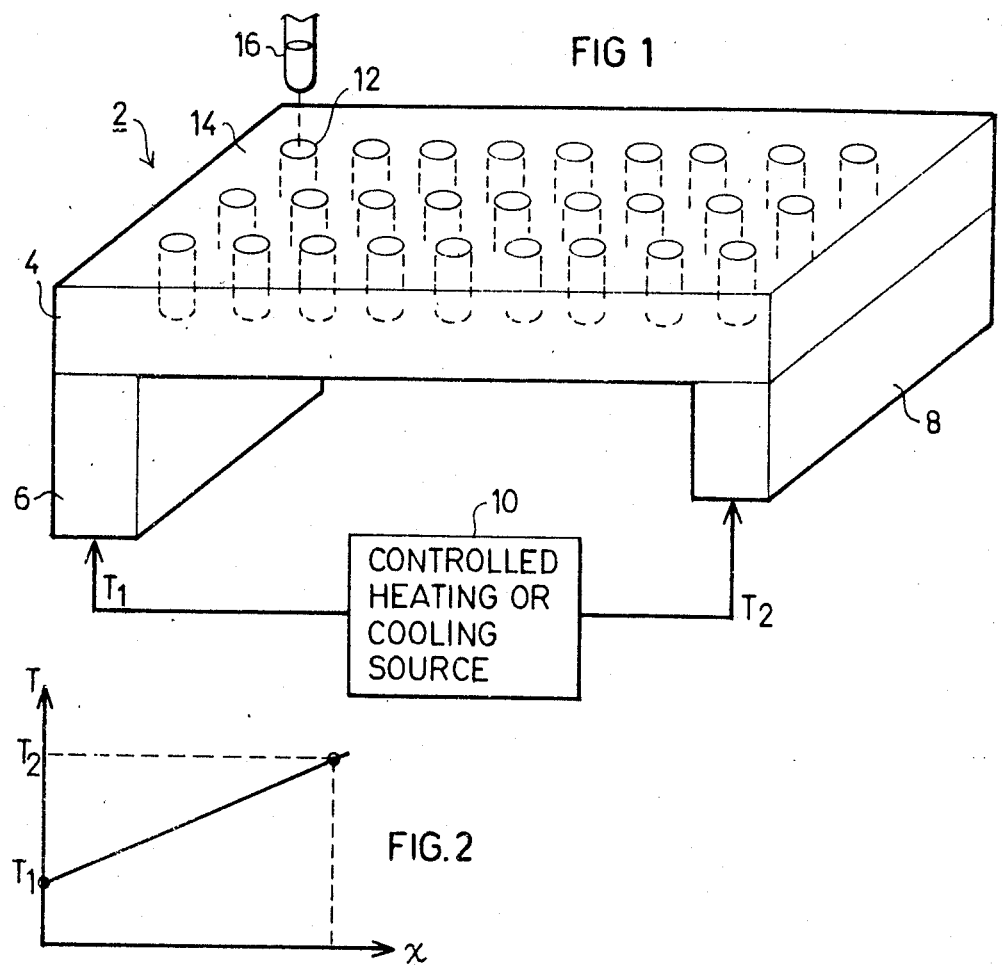
FIG 1
FIG. 2
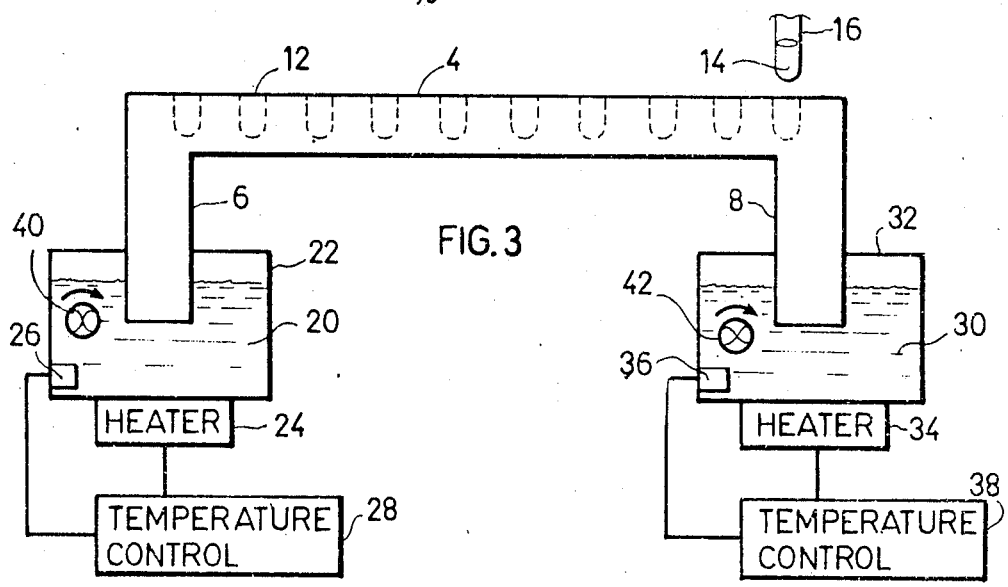
FIG. 3

METHOD AND APPARATUS FOR HEATING AND/OR COOLING OBJECTS SIMULTANEOUSLY AT DIFFERENT PRESELECTED TEMPERATURES

BACKGROUND OF THE INVENTION

The present invention relates to a method and apparatus for heating and/or cooling a plurality of objects simultaneously at a plurality of different preselected temperatures. The invention is particularly applicable for simultaneously heating and for cooling a plurality of different chemical samples or biological specimens to different preselected temperatures, and is therefore described below with respect to this application.

There are many occasions requiring chemical samples, biological specimens or the like to be simultaneously heated to different preselected temperatures, for example in biochemical analyses, in measuring reaction rates of chemical reactions, and in determining melting points of different substances. The conventional technique for heating or cooling such samples is to provide a controlled temperature environment for each of the samples, such as a bath or an oven, or a part of an oven, maintained at the required preselected temperature. Such arrangements are expensive and inconvenient, particularly when there are a large number of samples, for example ten, twenty or even more, to be heated and/or cooled at various temperatures.

An object of the present invention is to provide a very simple method and apparatus for the above purpose.

SUMMARY OF THE INVENTION

According to one broad aspect of the present invention, there is provided apparatus for heating and/or cooling a plurality of objects simultaneously at different preselected temperatures, comprising: a heat-conductive member; means for establishing a predetermined temperature difference between two spaced points of the heat-conductive member and, thereby, a constant temperature gradient between the points; supporting means for supporting the plurality of objects in heat-exchange relationship with respect to predetermined locations of the temperature gradient according to the preselected temperatures to which the respective objects are to be heated or cooled and temperature control means for maintaining the two spaced points of the heat-conductive member at the predetermined temperature difference during the heating or cooling of the objects.

In the preferred embodiment of the invention described below, the heat-conductive member is formed with a plurality of sockets along the length thereof which sockets constitute the supporting means for supporting the plurality of objects in heat-exchange relationship with the heat-conductive member. The apparatus is particularly useful when the heat-conductive member is formed with at least ten and preferably more sockets spaced along the length thereof for heating or cooling a corresponding number of objects or samples to different pre-elected temperatures.

In the described preferred environment, the supporting means includes a first container containing a liquid maintained at a first predetermined temperature, and a second container containing a liquid maintained at a second predetermined temperature, the opposite ends of the heat-conductive member being immersed in the liquids of the first and second containers, respectively.

According to another aspect of the present invention, there is provided a method for heating and/or cooling a plurality of objects simultaneously at a plurality of different preselected temperatures, comprising: establishing a constant temperature gradient over a length of a heat-conductive member by producing a predetermined temperature difference between two spaced points of the heat-conductive member; bringing the plurality of objects into heat-exchange relationship with predetermined locations of the temperature gradient according to the preselected temperatures to which the respective object is to be heated or cooled; and maintaining the predetermined temperature difference at the two spaced points of the heat-conductive member during the heating or cooling of the objects.

It will thus be seen that the present invention provides a very efficient, simple and inexpensive method of simultaneously heating or cooling a large number of objects, in the tens, hundreds or even more, almost without limitation, at a plurality of different preselected temperatures.

Further features and advantages of the invention will be apparent from the description below.

BRIEF DESCRIPTION OF THE DRAWINGS

The invention is herein described, by way of example only, with reference to the accompanying drawings, wherein:

FIG. 1 illustrates one form of apparatus constructed in accordance with the present invention;

FIG. 2 is a graph illustrating the constant temperature gradient established by the apparatus in FIG. 1; and FIG. 3 illustrates one preferred form of implementation of the apparatus of FIG. 1.

DESCRIPTION OF A PREFERRED EMBODIMENT

With reference to FIG. 1, there is illustrated a heat-conductive member, generally designated 2, constituted of a solid plate 4 having a pair of depending legs 6 and 8, heated or cooled by a controlled heating or cooling source, generally designated 10. Source 10 heats or cools leg 6 to one temperature $T_1$ and leg 8 to a second different temperature $T_2$, and maintains the two legs at these two temperatures during the operation of the device.

It will thus be seen that a constant and uniform temperature gradient is established, as shown in FIG. 2, along the length of the heat-conductive plate 4, with each point having a temperature "T" changing from temperature $T_1$ to $T_2$ linearly according to the distance "x" of the point from end 6 of the heat-conductive member 2.

The heat-conductive plate 4 is formed with a matrix of blind bores 12, which bores serve as sockets for receiving samples of the substances to be heated or cooled. In FIG. 1, these samples are indicated at 14, and are received within test tubes 16 to be inserted within the respective sockets 12 according to the temperature to which the sample is to be heated or cooled. In order to establish a good heat-exchange relationship between the heat-conductive plate 4 and the respective sample 14, the sockets 12 are filled with a liquid, such as water, in which the respective test tubes 16 are immersed.

For purposes of example, the heat-conductive plate 4 is illustrated as being formed with a rectangular matrix of thirty bores 12 arranged in three horizontal rows, each including ten bores. It will thus be seen that such a matrix of bores is capable of heating or cooling thirty different specimens divided into ten groups, with each group of three specimens being heated or cooled to ten different temperatures.

FIG. 3 illustrates one preferred arrangement that may be used for the controlled heating or heating cooling source 10 in FIG. 1, for establishing the temperature gradient across plate member 4 and for maintaining this temperature gradient during the heating or cooling of the specimens 14 within the test tubes 16. Thus, as shown in FIG. 3, one leg 6 of the heat-conductive member 4 is immersed in a liquid 20 within a container 22, which container is heated by a heater 24. The container includes a temperature sensor 26 for measuring the temperature of liquid 20 within it, the temperature sensor controlling the temperature of heater 24 via a control device 28 in order to maintain liquid 20 at a preselected temperature. The opposite leg 8 of the heat-conductive member 2 is similarly immersed in a liquid 30 within a container 32 heated by a heater 34 and maintained at the preselected temperature by a sensor 36 controlling the heater 34 via a temperature control device 38. Preferably, both liquids 20 and 30, in which the two legs 6 and 8 of the heat-conductive member 2 are immersed, are continuously agitated by agitators 40 and 42, respectively, so as to maintain the liquids 20, 30, and thereby legs 6, 8, at their respective preselected temperatures, after equilibrium has been reached following an initial start-up period.

It will thus be seen that all the samples 14 are simultaneously heated (or cooled) to preselected temperatures according to their location along the temperture gradient established between the two legs 6 and 8 as illustrated in FIG. 2. The temperature gradient can be changed by merely changing the temperature of the liquids 20, 30, in which the two legs are immersed. In addition, some variation is also possible for shifting the gradient towards one direction or the other by merely changing the level of the liquids within their respective containers. Thus, if the temperature gradient is to be shifted towards temperature $T_1$ of leg 6, liquid 20 immersing that leg would be at a higher level than liquid 30 immersing the opposite leg 8; and vice versa. A shifting of the temperature gradient can also be effected by making one leg longer than the other.

Many other variations will be apparent. For example, instead of heating both legs, one leg may be heated and the other cooled, or both legs may be cooled, in which case the samples will be cooled to different temperatures. One particularly advantageous arrangement for establishing a large temperature gradient is to heat one leg to the desired temperature above ambient, and to cool the other leg to a temperature below ambient, e.g., by immersing the latter leg in ice water.

It will be appreciated that other heating or cooling means could be used, for example by incorporating heating or cooling elements, such as coils, within bores formed in the ends of the heat-conductive member, or enclosing the coils around such ends. In addition, the sockets receiving the samples to be heated or cooled may be disposed in a single longitudinal row along the length of the heat-conductive plate 4, or along a plurality of diagonal lines, rather than along vertical lines, spaced along the length of the plate so as to increase the number of different temperatures to which the samples may be simultaneously heated or cooled. It is also possible to have a plurality of gradients on the same heat-conductive member, by merely selecting two spaced points for each gradient, and maintaining a predetermined temperature differential between them.

Many other variations, modifications and applications of the invention will be apparent.

What is claimed is:

1. A method of heating and/or cooling a plurality of objects simultaneously at a plurality of different preselected temperatures, comprising: establishing a constant temperature gradient over a length of a heat-conductive member by producing a predetermined temperature difference between two spaced points of said heat-conductive member; bringing said plurality of objects into heat-exchange relationship with predetermined locations of said temperature gradient according to the preselected temperatures to which the respective object is to be heated or cooled; and maintaining said predetermined temperature difference at said two spaced points of the heat-conductive member during the heating or cooling of said objects.

2. Apparatus for heating and/or cooling a plurality of objects simultaneously at different preselected temperatures comprising: a heat-conductive member; means for establishing a predetermined temperature difference between two spaced points of said heat-conductive member and, thereby, a constant temperature gradient between said points; supporting means for supporting said plurality of objects in heat-exchange relationship with respect to predetermined locations of said temperature gradient according to the preselected temperatures to which the respective objects are to be heated or cooled; and temperature control means for maintaining said two spaced points of said heat-conductive member at said predetermined temperature difference during the heating or cooling of said objects.

3. Apparatus according to claim 2, wherein said heat-conductive member is formed with a plurality of sockets along the length thereof which sockets constitute said supporting means for supporting said plurality of objects in heat-exchange relationship with said heat-conductive member.

4. Apparatus according to claim 3, wherein said heat-conductive member is formed with at least ten sockets at different preselected temperatures.

5. Apparatus according to claim 3,
wherein said heat-conductive member is a solid body having blind bores along the length thereof constituting said sockets.

6. Apparatus according to claim 3,
wherein said objects are samples included in separate test tubes, and said sockets are filled with liquid in which the test tubes are immersed for heating the samples.

7. Apparatus according to claim 2,
wherein said heat-conductive member comprises a solid plate formed at opposite ends with depending legs in heat-exchange relationship with said temperature control means.

8. Apparatus according to claim 2,
wherein said supporting means includes a first container containing a liquid maintained at a first predetermined temperature, and a second container containing a liquid maintained at a second predetermined temperature, the opposite ends of said heat-conductive member being immersed in the liquids of said first and second containers, respectively.

9. Apparatus according to claim 2, wherein said means for establishing said temperature gradient includes means for heating one of said ends of the heat-conductive member to a first temperature above ambient, and means for cooling the other of said ends of the heat-conductive member to a second predetermined temperature below ambient.

10. Apparatus according to claim 2, wherein said means for establishing said temperature gradient includes means for heating both of said ends of the heat-conductive member two different predetermined temperatures both above ambient.

* * * * *